United States Patent
Auvinen

[11] Patent Number: 5,842,813
[45] Date of Patent: Dec. 1, 1998

[54] METHOD OF COLD TECHNOLOGY BASED IRRIGATION OF AREAS AFFECTED BY ARIDITY

[76] Inventor: Heikki Auvinen, Harjuviita 1 B 29, Espoo, Finland, FIN-02110

[21] Appl. No.: 716,171
[22] PCT Filed: Mar. 17, 1995
[86] PCT No.: PCT/FI95/00143
§ 371 Date: Nov. 21, 1996
§ 102(e) Date: Nov. 21, 1996
[87] PCT Pub. No.: WO95/25425
PCT Pub. Date: Sep. 28, 1995

[30] Foreign Application Priority Data

Mar. 18, 1994 [FI] Finland ..................................... 941303

[51] Int. Cl.⁶ ............................. E02B 11/00; E02D 19/14
[52] U.S. Cl. ............................................. 405/36; 405/130
[58] Field of Search ................................ 405/39, 38, 130, 405/36; 62/260; 239/2.1

[56] References Cited

U.S. PATENT DOCUMENTS

| | | | |
|---|---|---|---|
| H1237 | 10/1993 | Lowther et al. ...................... | 62/260 X |
| 3,461,675 | 8/1969 | Izatt ........................................... | 405/38 |
| 4,538,377 | 9/1985 | Thornton ................................ | 405/39 X |
| 4,632,604 | 12/1986 | McKelvy ............................. | 405/130 X |
| 5,551,799 | 9/1996 | Dash ....................................... | 405/128 |

FOREIGN PATENT DOCUMENTS

| | | | |
|---|---|---|---|
| 3410132 | 10/1985 | Germany ................................ | 405/130 |
| 1276760 | 12/1986 | U.S.S.R. .................................. | 405/36 |

*Primary Examiner*—Tamara L. Graysay
*Assistant Examiner*—Jong-Suk Lee
*Attorney, Agent, or Firm*—Cohen, Pontani, Lieberman & Pavane

[57] ABSTRACT

A method of a cold-technology-based irrigation of areas affected by aridity based on restoration of the energy balance (energothasis) of each unit area (square meter, acre, hectare, square kilometer, etc.) by utilizing imported external energy (electric transmission lines diesel generators, solar energy and/or wind energy) to increase the energy intensity of the unit area concerned. The imported energy will be stored in ice or low-temperature soil produced by artificial cooling, creating an artificial temperature gradient within the unit area concerned and resulting in condensation of water from the air and elevation of groundwater to-wards the cold layer.

8 Claims, 2 Drawing Sheets

METHOD OF COLD TECHNOLOGY BASED IRRIGATION OF AREAS AFFECTED BY ARIDITY

BACKGROUND OF THE INVENTION

1. Field of the Invention

The present invention relates to a method and system for irrigation of areas affected by aridity.

2. Description of the Related Art

The laws of thermodynamics governing the temperature differences between hot and cold concern basic physical phenomena, and they are widely used in practical applications. In geophysics, however, practical applications are rarer, and research is only now getting underway in regard to technologies for controlling the adverse effects of permafrost or annual freezing of the soil, e.g. on building construction in arctic regions. There are also applications where oil pipelines or houses are constructed on piles filled with liquid or high thermal conductivity thereby preventing the transfer of heat from the building into the permafrost.

Established technologies exist for creating artificial heat and cold, i.e. heat pumps and their various specific applications. In Finland, heat pump technology is used in house heating, for refrigerating ice rinks and, regarding geophysical applications, for drying golf greens where equipment based on the same technology is operated in the opposite direction.

SUMMARY OF THE INVENTION

The present invention is aimed at establishing a novel method and system for irrigation of areas affected by aridity. The invention is based on the principle of creating in soil an artificial temperature gradient whereby a layer of frozen or cool soil is formed.

The energy required for cooling can be either imported via electric power lines or produced by diesel compressors. Conventional and familiar technology for energy production is available both in Finland and abroad. Exploitation of the waste heat generated is possible by means of the serial evaporation technology recently introduced in Finland (Tampella). In addition to conventional energy technologies, emerging solar and wind energy production methods are applicable as sources of energy provided that the power generated from these sources is sufficient for cooling or for maintenance of the required temperature gradient.

The invention is explained below by means of an example of a preferred application by reference to FIGS. 1 and 2 illustrating schematically the principle of operation of a method, and system based on the invention.

DESCRIPTION OF THE PREFERRED EMBODIMENTS

Figure 1:
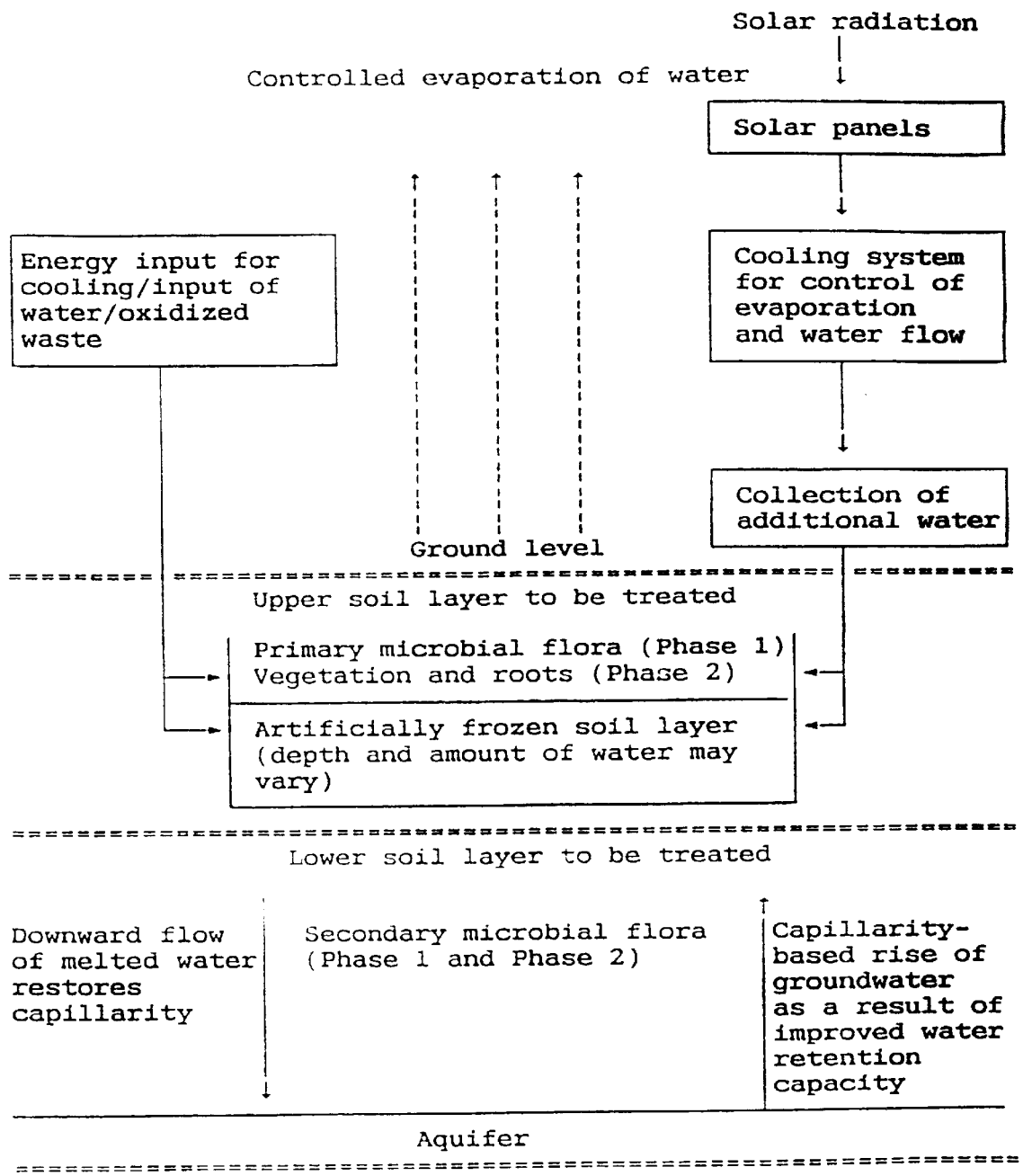
FIG. 1 schematically illustrates the principle of operation of a method and system in accordance with the present invention.

Natural environments where freezing and cooling technology (also known as Kirsi technology) based on the invention can be utilized must have two primary sources of water, atmospheric water vapor for condensation and the groundwater, and must in addition meet the following requirements.

The humidity of the air must be sufficient to allow water condensation as a result of the temperature gradient created by cooling of a deep soil layer or, as the case may be, the top soil; diurnal changes in air humidity will be taken into account.

The location must be in the desert zone or in an arid or semiarid region or in a region otherwise affected by aridity; a factor common to all such areas is a fall in groundwater level so that plant rhizomes or the natural capillarity of the soil are no longer able to make the groundwater available to vegetation.

SYSTEM STRUCTURE

Working from the premises presented above, a system can be constructed, based on a method described below, for irrigation of arid regions (a generic concept encompassing all the above-mentioned areas) and for production of new vegetation (biomass). The method is based on restoration of the energy balance (energothases) of each unit area (square meter, acre hectare, square kilometer, etc.) by utilizing imported external energy (electric transmission lines, diesel generators, solar energy and/or wind energy) to increase the energy intensity of the unit area concerned. The imported energy will be stored in ice or low-temperature soil produced by artificial cooling, creating an artificial temperature gradient within the unit area concerned and resulting in condensation of water from the air and elevation of groundwater towards the cold layer. Utilization (forestation and agriculture) of the unit area concerned can then be gradually initiated by means of established soil improvement methods, i.e. desalination) and fertilization techniques (i.e. use of oxidized waste produced by composting).

FUNCTION OF THE SYSTEM

The function of the system comprises two distinct phases, with a functional first phase being a prerequisite for the second phase:

Phase 1

The estimated duration of the first phase will depend on the cyclicity of the biosphere of the unit area concerned and on the available cooling capacity. A pipe system (e.g. weldable piping 45 mm in diameter and containing glycerol or a salt solution as the heat transfer liquid) akin to that used for refrigerating ice rinks will be buried in the ground at a depth of 1 to 2 meters and used to remove heat from the soil. With use of heat exchangers, the extracted heat can be utilized by conducting the output energy into serial evaporation equipment (distillation) which, in turn, can be used to distill sea water for supplementary irrigation or to remove from groundwater salts and other substances that may be harmful to plant cultivation.

Starting of the system may require fresh water which may be imported to the area or obtained by making use of any rainy season in the unit area concerned. The system can be started up without importation of supplementary water or nutrient components in regions where air humidity is sufficient (e.g. over 80%) to enable water to condense in the soil between the frozen layer and the soil surface. Water can be stored in underground and above-ground water recovery equipment.

The energy management of the cooling process can also be rendered more effective by means of existing technology and substances, such as biofilm or construction of soil layers with improved water retention properties above the cooled layer. Improved water retention can be achieved, i.e. with horticultural peat, vermiculite or special substances such as TERRACOTEM plant and soil conditioning preparations, a product developed and patented in Belgium. Even the use of mechanical shading, e.g. solar panels, is an option for reducing the cooling requirement in analogy with the shading effect of normal vegetation.

When a cold layer has been created in the soil by means of artificial cooling, the layer starts to condense water vapor from the air according to established laws of thermodynamics. According to the very same thermodynamic phenomenon, sustained cooling also prevents excessive evaporation of water caused by wind and solar radiation. The cold layer attracts water vapor like a magnet attracts iron filings, creating a favorable environment for an actively growing microbial flora. Natural mechanisms enable this microbial flora to bind oxygen, water and energy for subsequent utilization of the soil layer. The collection of the condensed water can be made efficient by means of established water recovery methods.

WATER RISE PHENOMENON BELOW THE COOLED LAYER:

Concurrently, melting caused by geothermal heat gets underway on the lower surface of the artificially frozen soil layer. This is a well-known annual phenomenon in arctic regions. The melting rate of the lower surface of the frozen soil layer will be controlled by means of energy obtained from external sources. The frozen soil layer will obtain additional water from the air in the form of condensed water vapor. The melting is allowed to continue in a controlled fashion until the flow reaches the aquifer. The capillarity phenomenon of the soil can be availed of if the groundwater is less than nine meters below ground level, since the upper limit for physical rise of the water is about nine meters.

In case the groundwater has fallen below nine meters, water movement caused by temperature gradients can be utilized in combination with other technologies, for instance, by filling holes in the ground to facilitate the rise of water. Even conventional pump technology can be used to elevate the fallen groundwater level sufficiently to allow utilization of the capillarity phenomenon or condensation of water from the air.

Even the layer below the cooled soil layer will obtain a microbial system of this own in order to establish and subsequently maintain a water retention capacity. The flow of water containing oxidized waste can also be regulated by various mechanical and structural means.

The first phase is characterized by a so-called learning curve phenomenon as a result of which, after several operational cycles, ever smaller inputs of external energy, water and biological waste are required, since the microbial systems of the treated soil layers become independent as the energy intensity of the unit area concerned approaches the limit of normal water retention capacity. At this stage the preconditions exist for the second phase without any artificial irrigation system.

Phase 2

When the first-phase microbial floras and a moist connection to the aquifer are in shape, second-phase activities can be initiated in the area. Water- and nitrogen-binding plants and initially even artificial root systems can then be planted in the soil; or silt or other similar substance with good water conduction properties can be used to construct vertical 'pipelines' in the soil to enhance capillarity. The technique to be used will be chosen according to soil type and other factors that affect the evaporation rate. If the groundwater in the area is salty, or there is sea water nearby, even plants known to be able to utilize salt water can be used.

If the groundwater is salty and the use of plants growing on salt water is excluded, maintenance of the frozen soil layer will be continued in the second phase because of the salinity of the rising groundwater. Additional water will have to be collected with water recovery equipment and by means of biologically oxidized nutrient components, that is, by adding oxidized, imported nitrogenous and other such nutrient fluids or solids to the soil. The nutrient components and the amount of water also depend on the application. Actual additional input of fresh water will not be required since the rate of water rise based on capillarity and the water retention capacity of the microbial flora has to be sufficient at this stage.

The frozen soil layer shall be so constructed that, in the second phase when the groundwater rises by means of restored capillarity, the rising water, e.g. in conditions of insufficient atmospheric humidity but sufficient groundwater, is with the help of various structural solutions able to penetrate the still-intact frozen soil layer which also functions as a desalination filter. The rising groundwater freezes on the lower surface and evaporates from the upper surface. In areas where salts dissolve in the groundwater do not present a problem, the porosity of the frozen soil layer will be secured either by means of thermally isolated artificial rhizomes or with holes that are kept open by the thermal energy released in the freezing process.

In case the biologically more complex plants are unable to thrive at this stage, it will be necessary to return to the first phase or operation and to raise the energy intensity per unit area by increasing the size of the microbial flora and by enhancing the water retention capacity of the lower layer of soil treatment.

EXPANSION OF THE SYSTEM

In connection with the technical implementation, the system can be expanded horizontally by constructing blocs of definite area that utilize the same local sources of energy and any serial evaporation equipment for water distillation. When the unit area concerned no longer requires artificial cooling, the pipe system will be left in the ground but its heat transfer substance will be removed. Should the need arise, the ready-fitted pipe system can be used again later on. Solar energy equipment and wind energy and other established or novel sources of energy can be availed of in the system once the energy outputs from these sources become sufficient.

PRINCIPLE OF THE KIRSI PUMP

Figure 2:
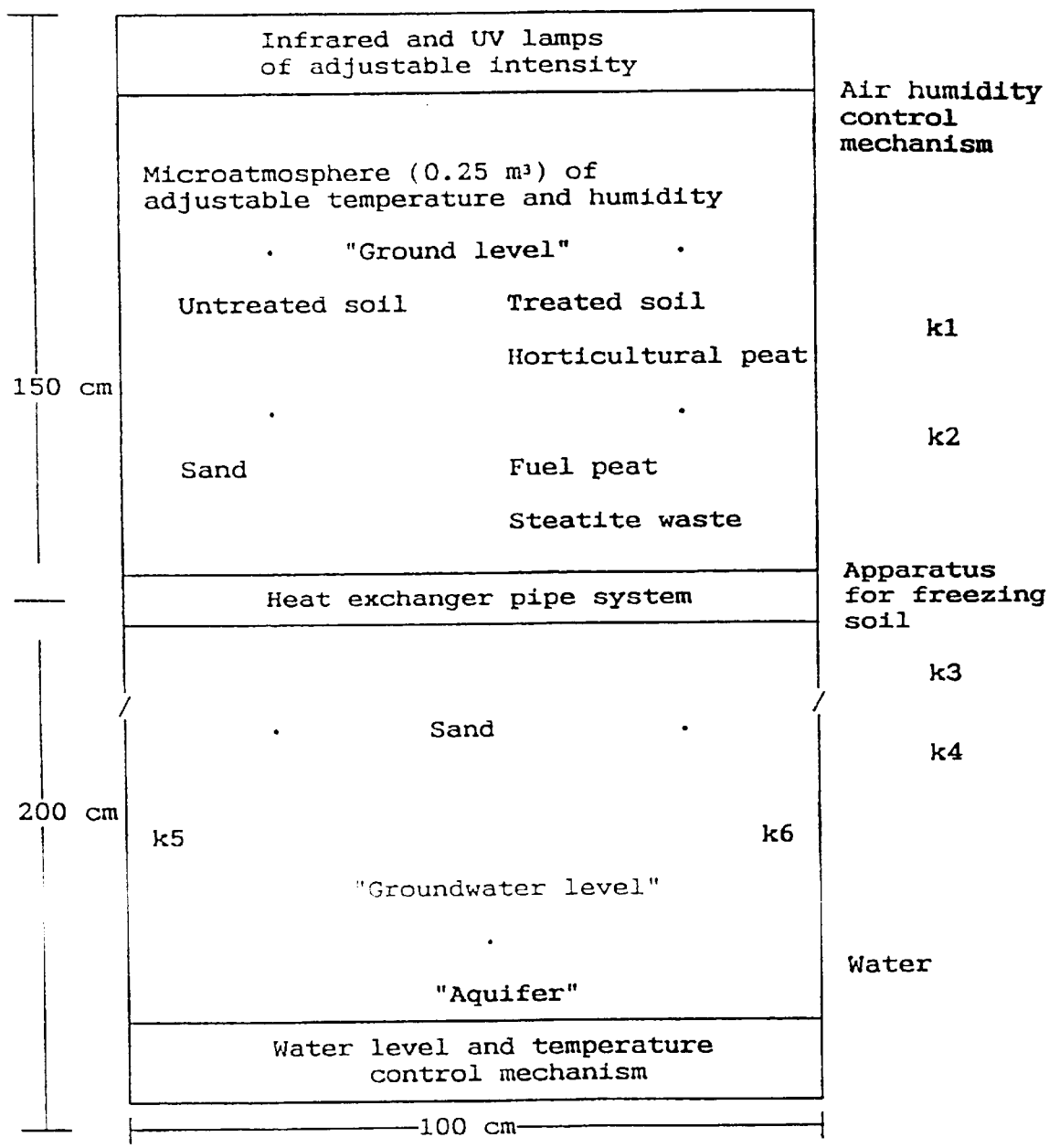
FIG. 2 schematically depicts a system for cold-technology-based irrigation in accordance with the invention.

The functionality of the method and system can be tested and the empirical energy consumption values in relation to water movements calculated by means of equipment presented in FIG. 2.

I claim:

1. A method of cold technology-based irrigation and fertilization in ground soil overlying a source of groundwater, comprising the steps of:

refrigerating the soil by directing a cooled liquid medium into a pipe system buried in the ground to conduct into and circulate in the soil the liquid medium so as to establish above the groundwater a sub-surface cooled layer of the soil;

after said refrigerating step, maintaining said sub-surface cooled layer of the soil by inputting an additional liquid medium into the soil to effect a lowered temperature of a second layer of the soil above said sub-surface cooled layer of the soil and to bind air-condensing moisture in said second layer of the soil so as to support establishment of a microbial flora in said second layer of the soil; and using water melted from said sub-surface cooled layer of the soil to establish a liquid connection between the microbial flora in said second layer of the soil and the groundwater.

2. A method in accordance with claim 1, wherein said sub-surface cooled layer is allowed to melt along a lower surface of said sub-surface layer during said step of maintaining said sub-surface cooled layer, further comprising the step of replacing liquid melted from the sub-surface layer by further input into the soil of one of the cooled liquid medium and the additional liquid medium.

3. A method in accordance with claim 1, wherein the cooled liquid medium is selected from the group consisting of water, fresh water, liquid fertilizer and waste water.

4. A method in accordance with claim 1, wherein the additional liquid medium is selected from the group consisting of water, fresh water, liquid fertilizer and waste water.

5. A method in accordance with claim 1, wherein said step of maintaining further comprises inputting the additional liquid medium into one of the sub-surface cooled layer and the second layer of the soil.

6. A method in accordance with claim 1, further comprising the steps of utilizing geothermal energy to melt a lower surface of said sub-surface cooled layer, and further inputting the additional liquid medium into the soil to replace liquid melted from the sub-surface cooled layer until the melted liquid reaches the groundwater.

7. A method in accordance with claim 1, wherein geothermal energy and solar energy are utilized to provide substantially all energy required to carry out the steps of said method.

8. A method in accordance with claim 1, further comprising the step of establishing, after said step of using water melted from said sub-surface cooled layer and after substantially complete melting of said sub-surface cooled layer of the soil, capillarity in the soil between said second layer and the groundwater to thereafter continuously maintain a moisture and energy balance throughout the soil above the groundwater.

* * * * *